US008582883B2

(12) United States Patent
Franz et al.

(10) Patent No.: US 8,582,883 B2
(45) Date of Patent: Nov. 12, 2013

(54) SIMULTANEOUS MODEL-BASED SEGMENTATION OF OBJECTS SATISFYING PRE-DEFINED SPATIAL RELATIONSHIPS

(75) Inventors: Astrid Ruth Franz, Hamburg (DE); Tobias Klinder, Uelzen (DE); Robin Mitja Benjamin Wolz, London (GB); Cristian Lorenz, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 347 days.

(21) Appl. No.: 12/935,037

(22) PCT Filed: Mar. 30, 2009

(86) PCT No.: PCT/IB2009/051302
§ 371 (c)(1),
(2), (4) Date: Nov. 16, 2010

(87) PCT Pub. No.: WO2009/122338
PCT Pub. Date: Oct. 8, 2009

(65) Prior Publication Data
US 2011/0058061 A1 Mar. 10, 2011

(30) Foreign Application Priority Data
Apr. 4, 2008 (EP) ..................................... 08154052

(51) Int. Cl.
*G06K 9/34* (2006.01)
(52) U.S. Cl.
USPC ....................................................... 382/173
(58) Field of Classification Search
None
See application file for complete search history.

(56) References Cited

U.S. PATENT DOCUMENTS

| 5,819,016 A * | 10/1998 | Watanabe et al. ............. 345/419 |
| 7,292,250 B2 * | 11/2007 | Sepulveda .................... 345/473 |
| 2005/0116938 A1 * | 6/2005 | Ito et al. ........................ 345/173 |
| 2006/0078194 A1 * | 4/2006 | Fradkin et al. ................ 382/154 |
| 2006/0110037 A1 | 5/2006 | Kaus et al. |
| 2006/0126922 A1 * | 6/2006 | Von Berg et al. ............. 382/154 |

(Continued)

FOREIGN PATENT DOCUMENTS

WO    2004010374 A2    1/2004

OTHER PUBLICATIONS

Schramm et al: "Towards Fully Automatic Object Detection and Segmentation"; Medical Imaging 2006, Joseph M. Reinhardt, Josien P.W. Pluim, Eds, Proceedings of SPIE, vol. 61544, pp. 614402-1-614402-10.

(Continued)

*Primary Examiner* — Barry Drennan
*Assistant Examiner* — Feng Niu

(57) ABSTRACT

The invention relates to a system (100) for segmenting a plurality of objects in image data using simultaneous model-based image segmentation. A surface mesh is adapted to each object to be segmented. To avoid or reduce the possibility of mesh collision, a plurality of connecting edges for connecting two proximal meshes are used. A connection energy defined for the plurality of connecting edges allows controlling the spatial relationship between the first and second mesh. This is achieved by including in the connection energy expression terms that will increase the connection energy when the lengths of edges of the plurality of connecting edges connecting the first and second mesh decrease. Using the reference configuration of the plurality of connecting edges defined based on the pre-positioned first and second mesh allows taking into account prior knowledge about a typical spatial relationship between the first and second object of the plurality of objects.

17 Claims, 6 Drawing Sheets

(56) References Cited

U.S. PATENT DOCUMENTS

| | | | |
|---|---|---|---|
| 2006/0182312 A1* | 8/2006 | Nakai et al. ................. | 382/103 |
| 2007/0058865 A1 | 3/2007 | Li et al. | |
| 2007/0167699 A1* | 7/2007 | Lathuiliere et al. ......... | 600/407 |
| 2008/0143724 A1* | 6/2008 | Russakoff ................... | 345/441 |

OTHER PUBLICATIONS

Franz et al: "Simultaneous Model-Based Segmentation of Multiple Objects"; Proceedings Des Workshops, vol. 6, Bis. 8, Apr. 2008, pp. 252-256.

Weese et al: "Shape Constrained Deformable Models for 3D Medical Image Segmentation"; IPMI 2001, Lecture Notes in Computer Science (LNCS), vol. 2082, pp. 380-387, 2001.

Kaus et al: "Automated Segmentation of the Left Ventricle in Cardiac MRI"; MICCAI 2003, Lecture Notes in Computer Science (LNCS), vol. 2878, pp. 380-387, 2003.

Delingette, H.: "General Object Reconstruction Based on Simplex Meshes"; International Journal of Computer Vision, vol. 32, 1999, pp. 111-142.

Gavriliu, M.: "Adaptive Mesh Extraction From Volumetric Data"; Thesis, California Institute of Technology, 2001, 54 Page Document.

Angelini et al: "State of the Art of Level Set Methods in Segmentation and Registration of Medical Imaging Modalities"; Handbook of Biomedical Image Analysis, vol. III: Registration Models, 2005, Chapter 2, pp. 47-101.

Maciel, A.: "A Biomechanics-Based Articulation Model for Medical Applications"; EPFL # 3360, 2005, Ph.D Thesis, 204 Pages.

Stefanescu, R.: "Parallel Nonlinear Registration of Medical Images With a Priori Information on Anatomy and Pathology"; Thesis, University of Nice Sophia-Antipolis, Mar. 2005, 141 Pages.

McInerney et al: "Deformable Models"; Handbook of Medical Imaging, Chapter 8, Academic Press, 2000, pp. 127-145.

Ecabert et al: "Automatic Heart Segmentation in CT: Current and Future Applications"; Medicamundi, vol. 50, No. 3, 2006, pp. 12-17.

Kaus et al: "Automated Segmentation of the Left Ventricle in Cardiac MRI"; Medical Image Analysis, vol. 8, 2004, pp. 245-254.

* cited by examiner

SIMULTANEOUS MODEL-BASED SEGMENTATION OF OBJECTS SATISFYING PRE-DEFINED SPATIAL RELATIONSHIPS

FIELD OF THE INVENTION

The invention relates to image segmentation and more particularly to simultaneous model-based segmentation of multiple objects in image data.

BACKGROUND OF THE INVENTION

Model-based segmentation has numerous applications in interventions and follow-up studies, for instance in radiation therapy planning Deformable models, described by flexible surface meshes, for instance triangle meshes, are adapted to the corresponding image structures. Usually this adaptation is carried out for every object separately by optimizing a weighted sum of two competing energies: an external energy driving the mesh triangles towards features in the image, and an internal energy preserving the form of the model. An implementation of this method is described by J. Weese, M. Kaus, C. Lorenz, S. Lobregt, R. Truyen, V. Pekar in "Shape constrained deformable models for 3D medical Image segmentation", IPMI 2001, 380-387, hereinafter referred to as Ref. 1.

A separate adaptation of multiple meshes cannot take spatial relations between several objects into account and hence often results in wrong adaptation results such as for instance intersecting meshes. A first attempt to overcome this problem is described in WO 2004/010374 A2 "Simultaneous segmentation of multiple or composed objects by mesh adaptation". There, additional edges connecting two meshes are introduced into the model. These additional edges are considered as degenerated triangles, and the internal energy is extended for these triangles in order to keep the spatial relationship of the two meshes. However, this procedure is only applicable when the spatial relationship of two objects can be described by pre-positioning the corresponding meshes, since the lengths and positions of the additional edges or triangles are to be preserved. But in a lot of medical applications inner organs are involved which can slide with respect to each other, for instance the organs in the abdominal region, the lung with respect to the rib cage, or two successive vertebrae in the spine. For such organs simultaneous segmentation with the method described in WO 2004/010374 A2 can only avoid mesh intersection if the meshes are correctly pre-positioned, but will nevertheless result in an adaptation with wrong spatial relationships.

SUMMARY OF THE INVENTION

It would be advantageous to provide means for the simultaneous segmentation of objects close to each other, while ensuring required spatial relationships or minimizing the likelihood of violating required spatial relationships of the meshes adapted to these objects.

Thus, in an aspect, the invention provides a system for segmenting a plurality of objects in image data using simultaneous model-based image segmentation, the system comprising:
 a pre-positioning unit for pre-positioning a first mesh for segmenting a first object of the plurality of objects, thereby initializing a first mesh current position, and for pre-positioning a second mesh for segmenting a second object of the plurality of objects, thereby initializing a second mesh current position;
 a connection unit for defining a plurality of connecting edges for connecting first end vertices to second end vertices, wherein the first and second end vertices are selected from vertices of the first and second mesh, respectively;
 a feature unit for identifying first features in the image data for computing an external energy of the first mesh on the basis of the first mesh current position, and for identifying second features in the image data for computing an external energy of the second mesh on the basis of the second mesh current position;
 a transformation unit for computing a first transformation which best aligns the first mesh in the first mesh current position with the pre-positioned first mesh for computing an internal energy of the first mesh, and for computing a second transformation which best aligns the second mesh in the second mesh current position with the pre-positioned second mesh for computing an internal energy of the second mesh;
 an adaptation unit for updating the first and second mesh current position by varying current positions of vertices of the first and second mesh to minimize a weighted sum of at least the external energy and the internal energy of the first and second mesh and a connection energy, wherein the connection energy is computed based on the plurality of connecting edges in a configuration determined based on the first and second mesh current position and on the plurality of connecting edges in a reference configuration defined by the pre-positioned first and second mesh; and
 a control unit for evaluating a convergence condition dependent at least on the minimized weighted sum or on the updated position of the first and second mesh, and further for terminating segmenting the plurality of objects in the image data if the condition is satisfied and for continuing segmenting the plurality of objects in the image data if the condition is not satisfied.

The connection energy allows controlling the spatial relationship between the first and second mesh. This is achieved by including in the connection energy expression terms that will increase the connection energy when the lengths of edges of the plurality of connecting edges connecting the first and second mesh decrease. Using the reference configuration of the plurality of connecting edges defined based on the pre-positioned first and second mesh allows taking into account prior knowledge about a typical spatial relationship between the first and second object of the plurality of objects.

In an embodiment, the system further comprises a connection parameter unit for computing a parameter for calculating the connection energy. The parameter is used for updating the way of computing the connection energy based on the first and second mesh current position after pre-positioning and later after updating the first and second mesh current position.

In an embodiment of the system, the parameter for calculating the connection energy is a connection transformation for transforming the plurality of connecting edges which best aligns the plurality of connecting edges in the configuration determined based on the first and second mesh current position with the plurality of connecting edges in the reference configuration. The connection transformation defines a transformation of edges of the plurality of connecting edges which does not increase the connection energy. The connection transformation may be constrained to an affine transformation. An affine transformation allows shearing which results in a sliding displacement of the first mesh relative to the second mesh. Furthermore, using isotropic scaling of the plurality of connecting edges helps preserving typical distances between the two meshes.

In an embodiment of the system, the connection energy is based on vector differences of edges of the plurality of connecting edges in the configuration determined based on the first and second mesh current position and further transformed using the connection transformation and respective edges of the plurality of connecting edges in the reference configuration. For example, the connection energy may be defined as a sum of squares of differences of respective edges. Such an expression can be easily minimized using a linear algebra method such as the conjugate gradient method.

In an embodiment of the system, the parameter for calculating the connection energy is a vector computed based on positions of the first end vertices and on positions of the second end vertices. The computed vector may be perpendicular to a plane locally separating the first and second mesh. The vector defines a direction in which shortening and extending the distance between the first and second mesh may be hindered.

In an embodiment of the system, the connection energy is based on scalar products of the vector by edges of the plurality of connecting edges in the configuration determined based on the first and second mesh current position and by respective edges of the plurality of connecting edges in the reference configuration. For a unit vector, the scalar product represents projections of edges on the direction defined by the vector.

In a further aspect of the invention, the system according to the invention is comprised in an image acquisition apparatus.

In a further aspect of the invention, the system according to the invention is comprised in a workstation.

In a further aspect, the invention provides a method of segmenting a plurality of objects in image data using simultaneous model-based image segmentation, the method comprising:
- a pre-positioning step for pre-positioning a first mesh for segmenting a first object of the plurality of objects, thereby initializing a first mesh current position, and for pre-positioning a second mesh for segmenting a second object of the plurality of objects, thereby initializing a second mesh current position;
- a connection step for defining a plurality of connecting edges for connecting first end vertices to second end vertices, wherein the first and second end vertices are selected from vertices of the first and second mesh, respectively;
- a feature step for identifying first features in the image data for computing an external energy of the first mesh on the basis of the first mesh current position, and for identifying second features in the image data for computing an external energy of the second mesh on the basis of the second mesh current position;
- a transformation step for computing a first transformation which best aligns the first mesh in the first mesh current position with the pre-positioned first mesh for computing an internal energy of the first mesh, and for computing a second transformation which best aligns the second mesh in the second mesh current position with the pre-positioned second mesh for computing an internal energy of the second mesh;
- an adaptation step for updating the first and second mesh current position by varying current positions of vertices of the first and second mesh to minimize a weighted sum of at least the external energy and the internal energy of the first and second mesh and a connection energy, wherein the connection energy is computed based on the plurality of connecting edges in a configuration determined based on the first and second mesh current position and on the plurality of connecting edges in a reference configuration defined by the pre-positioned first and second mesh; and
- a control step for evaluating a convergence condition dependent at least on the minimized weighted sum or on the updated position of the first and second mesh, and further for terminating segmenting the plurality of objects in the image data if the condition is satisfied and for continuing segmenting the plurality of objects in the image data if the condition is not satisfied.

In a further aspect, the invention provides a computer program product to be loaded by a computer arrangement, the computer program product comprising instructions for segmenting a plurality of objects in image data using simultaneous model-based image segmentation, the computer arrangement comprising a processing unit and a memory, the computer program product, after being loaded, providing said processing unit with the capability to carry out steps of the method of the invention.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system, can be carried out by a person skilled in the art on the basis of the present description.

A person skilled in the art will appreciate that the method may be applied to multidimensional image data, e.g., 2-dimensional (2-D), 3-dimensional (3-D) or 4-dimensional (4-D) images, acquired by various acquisition modalities such as, but not limited to, X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
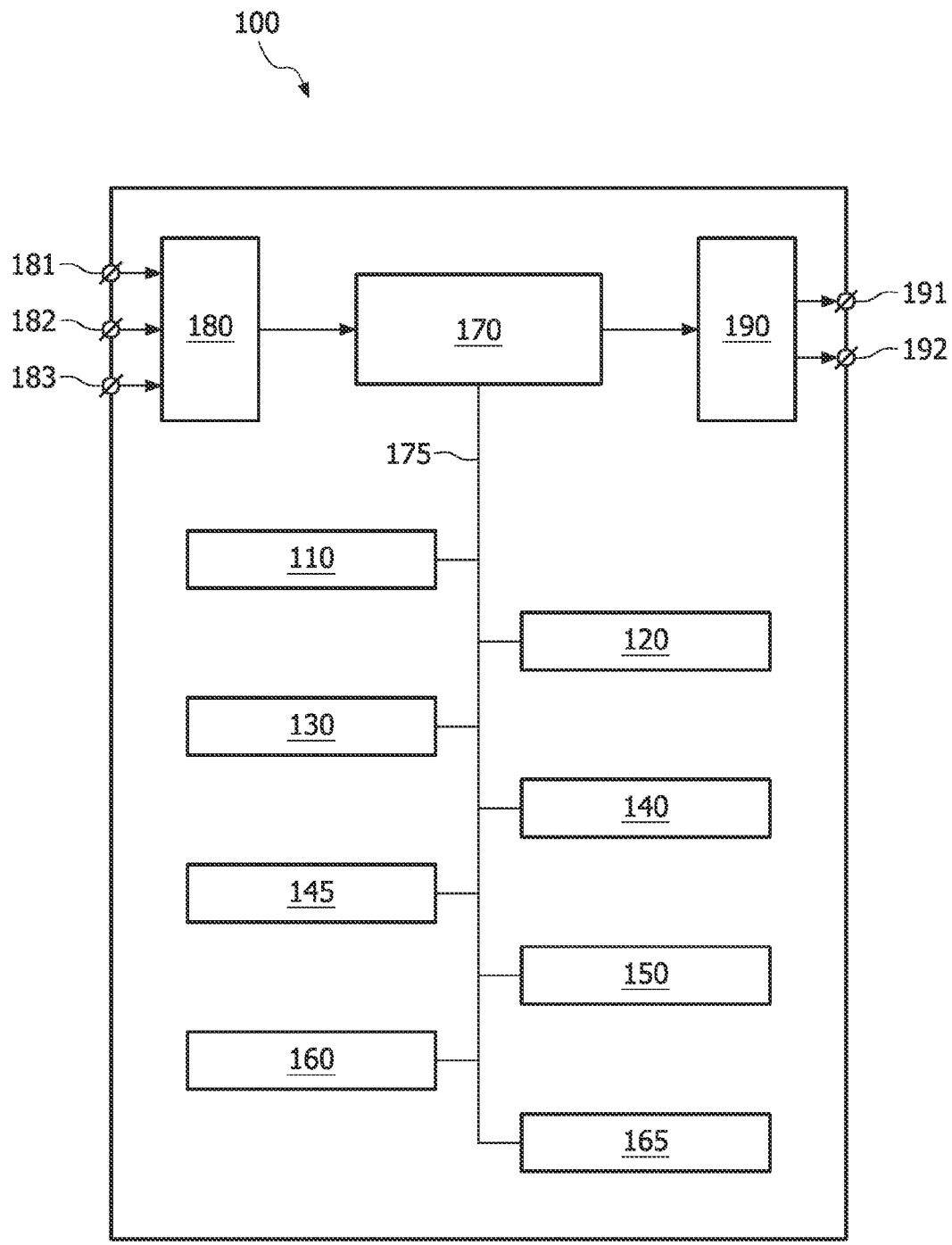
FIG. 1 schematically shows a block diagram of an exemplary embodiment of the system.

FIG. 1 schematically shows a block diagram of an exemplary embodiment of the system 100 for segmenting a plurality of objects in image data using simultaneous model-based image segmentation, the system comprising:

a pre-positioning unit 110 for pre-positioning a first mesh for segmenting a first object of the plurality of objects, thereby initializing a first mesh current position, and for pre-positioning a second mesh for segmenting a second object of the plurality of objects, thereby initializing a second mesh current position;

a connection unit 120 for defining a plurality of connecting edges for connecting first end vertices to second end vertices, wherein the first and second end vertices are selected from vertices of the first and second mesh, respectively;

a feature unit 130 for identifying first features in the image data for computing an external energy of the first mesh on the basis of the first mesh current position, and for identifying second features in the image data for computing an external energy of the second mesh on the basis of the second mesh current position;

a transformation unit 140 for computing a first transformation which best aligns the first mesh in the first mesh current position with the pre-positioned first mesh for computing an internal energy of the first mesh, and for computing a second transformation which best aligns the second mesh in the second mesh current position with the pre-positioned second mesh for computing an internal energy of the second mesh;

an adaptation unit 150 for updating the first and second mesh current position by varying current positions of vertices of the first and second mesh to minimize a weighted sum of at least the external energy and the internal energy of the first and second mesh and a connection energy, wherein the connection energy is computed based on the plurality of connecting edges in a configuration determined based on the first and second mesh current position and on the plurality of connecting edges in a reference configuration defined by the pre-positioned first and second mesh; and a control unit 160 for evaluating a convergence condition dependent at least on the minimized weighted sum or on the updated position of the first and second mesh, and further for terminating segmenting the plurality of objects in the image data if the condition is satisfied and for continuing segmenting the plurality of objects in the image data if the condition is not satisfied.

The exemplary embodiment of the system 100 further comprises the following units:

a connection parameter unit 145 for computing a parameter for calculating the connection energy;

a user interface 165 for communication between a user and the system 100; and a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

A person skilled in the art will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data may comprise, for example, the image data and model data, the model data comprising first and second mesh data. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the first and second mesh data adapted to the first and second object of the plurality of objects. The memory unit 170 may be also arranged to receive data from and/or deliver data to the units of the system 100 comprising the pre-positioning unit 110, the connection unit 120, the feature unit 130, the transformation unit 140, the adaptation unit 150, the control unit 160, and the user interface 165, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

Alternatively, the system 100 may comprise no memory unit 170 and no memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In an embodiment of the system 100, the system 100 comprises a user interface 165 for communication between a user and the system 100. The user interface 165 may be arranged to receive a user input for selecting the first and second mesh for adapting to the image, or a user input for defining the plurality of connecting edges. The user interface may further provide means for displaying a view of the first and second mesh adapted to the first and second object. Optionally, the user interface may receive a user input for selecting a mode of operation of the system such as, e.g., for defining the terms of the external, internal and/or connection energy. A person skilled in the art will understand that more functions may be advantageously implemented in the user interface 165 of the system 100.

In the claims, the embodiments of the invention are illustrated adapting a first and second mesh connected to each other by a plurality of connecting edges. A person skilled in the art will understand that the description may be generalized to describe multiple meshes interconnected with multiple pluralities of connecting edges. Obviously, multiple interconnected meshes comprise a first mesh connected to a second mesh via a plurality of connecting edges. Thus, multiple meshes interconnected with multiple pluralities of connecting edges are within the scope of the description as well as of the claims. Alternatively or additionally, the terms "first mesh", "second mesh", "first object" and "second object" may refer to "first part" and "second part" of one mesh and of one object, respectively.

For every object to be segmented, the pre-positioning unit 110 of the system 100 is arranged for pre-positioning a mesh close to the corresponding object. Pre-positioning may be manual or automatic and may involve detecting the first and second object. A method of detecting objects is described, for example, in "Towards fully automatic object detection and segmentation", Hauke Schramm et al., Proc. SPIE, Volume 6144, 614402, Medical Imaging 2006: Image Processing; Joseph M. Reinhardt, Josien P. Pluim; Eds., pp. 11-20. Pre-positioning the mesh yields an initialized current position of the mesh. The current position of each mesh can be defined by coordinates of each vertex of the mesh in a system of coordinates, e.g. the image data system of coordinates.

For any pair of meshes for which the user wishes to control how the two meshes are positioned with respect to each other, the connection unit 120 of the system 100 is arranged for defining a plurality of connecting edges for connecting first end vertices to second end vertices, wherein the first end vertices are selected from vertices of one mesh of said pair of meshes and second end vertices are selected from vertices of the other mesh of said pair of meshes. In an embodiment of the system 100, these connecting edges are computed automatically, given certain parameters, or they can be read from an input device. Additionally, the connection unit 120 may be adapted for reading data for defining the plurality of connecting edges from a file.

Next, for each mesh to be arranged to the corresponding object, a search of image features is carried out. The search is based on the current position of the first and second mesh. In an embodiment, the search of image features is carried out as described in Section 2.1 of Ref. 1, for example.

Next, for each mesh to be arranged to the corresponding object, the transformation unit 140 of the system 100 is adapted for computing a transformation which best aligns the mesh in the mesh current position with the corresponding pre-positioned mesh. The transformations are varied within a class of transformations. For example, the class of transformations may be similarity transformations or affine transformations. An implementation of computing said transformation which best aligns the mesh in the mesh current position with the corresponding pre-positioned mesh is described in Sections 2.3 and 2.4 of Ref. 1.

The current position of every mesh is updated by the adaptation unit 150 by varying current positions of vertices of every mesh to minimize a weighted sum of at least the external energy and the internal energy of every mesh and a connection energy of every pair of meshes connected with a plurality of connecting edges, wherein for each pair of connected meshes, the connection energy is computed based on the plurality of connecting edges in a configuration determined based on the current position of the first and second mesh and on the plurality of connecting edges in a reference configuration defined by the pre-positioned first and second mesh. The reference configuration of the plurality of connecting edges is defined based on prior knowledge of a typical spatial relation between the first and second mesh of each pair of meshes. For example, in an embodiment the weighted sum of the external, internal and connection energies may be expressed as:

$$E = \sum_{i=1}^{n} \alpha_i E_{ext,i} + \sum_{i=1}^{n} \beta_i E_{int,i} + \sum_{i=1}^{m} \gamma_i E_{con,i}.$$

In the above equation, $\alpha_i$, $\beta_i$, and $\gamma_i$ are weights of the energy contributions, n is the number of meshes to be adapted to the objects in the image data, m is the number of pluralities of connecting edges connecting pairs of meshes. The external energy $$E_{ext} = \sum_{i=1}^{n} \alpha_i E_{ext,i}$$

is computed as described in Section 2.2 of Ref. 1. The internal energy $$E_{int} = \sum_{i=1}^{n} \beta_i E_{int,i}$$

is computed as a sum of internal energies of each mesh $M_i$, i=1, ..., n.

$$E_{int,i} = \sum_{(j,k) \in Edges(M_i)} (\hat{x}_j - \hat{x}_k - s_i R_i (x_j - x_k))^2,$$

where $\hat{x}_{\cdot}$ denotes the vector of vertex coordinates of the corresponding mesh vertex in the prepositioned mesh and $x_{\cdot}$ denotes the vector of vertex coordinates of the mesh in the current position, and $R_i$ and $s_i$ denote, respectively, a rotation matrix and a scaling factor of a similarity transformation computed by the transformation unit 140 for the mesh $M_i$.

The connection energy $$E_{con} = \sum_{i=1}^{m} \gamma_i E_{con,i}$$

is a weighted sum of contributions $E_{con,i}$ of each plurality $C_i$, i=1, ..., m, of connecting edges connecting two meshes adapted to the corresponding objects in the image data.

In one embodiment of the system 100, each contribution $E_{con,i}$ of two connected meshes $M_k$ and $M_j$ is defined as $$E_{con,i} = \sum_{(j,k) \in Edges(C_i)} (\hat{x}_j - \hat{x}_k - A_i (x_j - x_k))^2,$$

where $A_i$ is an affine transformation for transforming the plurality of connecting edges which best aligns the plurality of connecting edges in the configuration determined based on the first and second mesh current position with the plurality of connecting edges in the reference configuration determined by vectors of vertex coordinates of pre-positioned meshes. The affine transformation is computed by the connection parameter unit 145.

Since an affine transformation allows shearing, the connected meshes can slide with respect to each other. If the relative distance between the two meshes is to be preserved, the affine transformation can be restricted to a uniform scaling factor for all three coordinate directions. Furthermore, if the absolute distance between the two meshes is to be preserved, this scaling factor can be set to 1. Hence the degrees of freedom of the affine map can be restricted in order to match the requirements of the underlying application.

The control unit 160 of the system 100 is arranged for evaluating a convergence condition dependent at least on the minimized weighted sum or on the updated position of the first and second mesh, and further for terminating segmenting the plurality of objects in the image data if the condition is satisfied and for continuing segmenting the plurality of objects in the image data if the condition is not satisfied. An exemplary condition may be that "the number of updates of the current positions of the meshes reached a maximum or the current positions have not significantly changed during the update or the computed energy is less than a predetermined threshold".

A person skilled in the art will recognize that the "energy" analogy is widely used in the art to describe model-based image segmentation. However, other terms, e.g. objective function, are used instead of the energy function. Similarly, minimizing the energy is an example of optimizing an objective function. Optimizing may be defined as finding a maximum of the objective function. Additionally, those skilled in the art will recognize that minimizing energy may be carried out by means of minimizing a force field without referring to the energy. Such a force field comprises forces acting on vertices of meshes adapted to the objects in the image data and may be minimized using simulated annealing, for example. Hence, the scope of the claims should not be construed as being limited by the particular choice of words and algorithms used in the claims and description.

Figure 2:
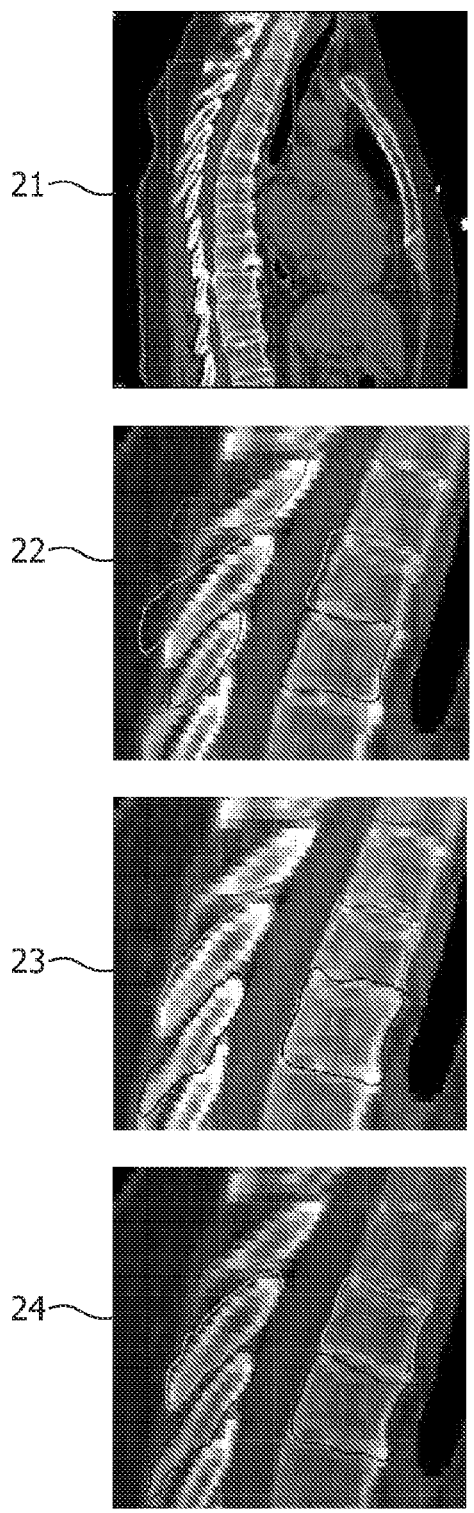
FIG. 2 shows an example of a medical application of a first embodiment of the system.

FIG. 2 shows an example of a medical application of the above described embodiment of the system. In the spine image 21, the third, fourth and fifth thoracic vertebrae are to be segmented. A pre-positioning of the three meshes is shown in the second image 22. The transition from cortical to cancellous bone is comparable to the bone boundary; hence a separate adaptation of each vertebra is likely to fail as illustrated in the third image 23. Including the connection energy with an arbitrary affine transformation (without reflection) as a parameter of the connection transformation successfully preserves the spatial relationship of the vertebral meshes and hence results in a reasonable segmentation as illustrated in the fourth image 24.

In an embodiment of the system 100, each contribution $E_{con,i}$ of two connected meshes $M_k$ and $M_j$ is defined as $$E_{con,i} = \sum_{(j,k)\in Edges(C_i)} (\langle x_k - x_j, v_i \rangle - \max(\langle \hat{x}_k - \hat{x}_j, \hat{v}_i \rangle, d_i))^2,$$

where $v_i$ denotes a vector perpendicular to parallel planes, the first plane defined by vertices of mesh $M_k$ connected to vertices of mesh $M_j$, the second plane defined by vertices of mesh $M_j$ connected to vertices of mesh $M_k$, the vector going from the first plane through the points of $M_k$ to the second plane through the points of $M_j$. The two planes can be computed using the least square approximation, for example. For each plurality of connecting edges, a required minimal distance $d_i$ is chosen based on requirements of the segmentation to be carried out. The angular brackets $\langle \bullet, \bullet \rangle$ denote a scalar product of the corresponding vectors.

In other words, the two parallel planes are fitted through the endpoints of these edges: one plane through the points of the one mesh and the other plane through the points of the other mesh. These planes approximately describe the positions of the neighboring surfaces of the two connected meshes. Each connecting edge is then projected onto the normal vector of the two planes. A negative value of this projection, i.e. of the scalar product of the edge by the normal vector, indicates an overlapping of the two meshes.

The connection energy contribution is arranged for penalizing such a negative value, and also for penalizing a positive length which is smaller than the required minimal distance between the two objects. If the projected length is at least the minimal distance, then this length is to be preserved by the connection energy. Since the connection energy contribution only considers the edge lengths projected onto the normal vector of the two planes, connecting edges may get longer or shorter as long as the distance between the two mesh surfaces is preserved. Hence, sliding of the meshes with respect to each other is allowed.

Figure 3:
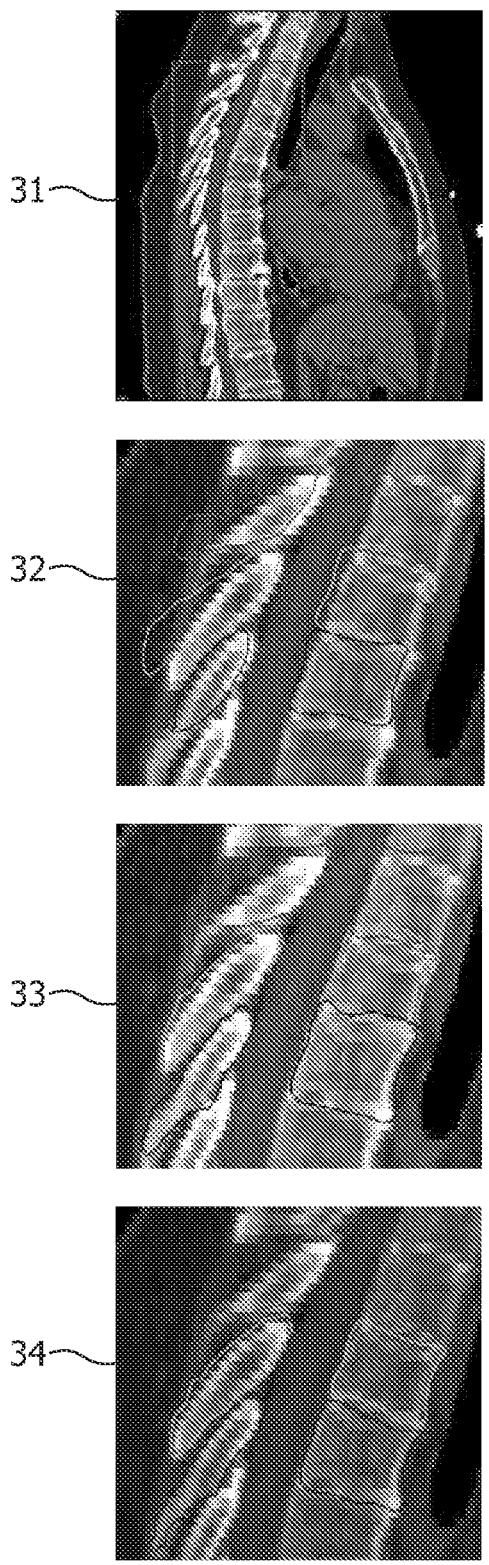
FIG. 3 shows an example of a medical application of a second embodiment of the system.

FIG. 3 shows an example of a medical application of the above described embodiment of the system. In the spine image 31, the third, fourth and fifth thoracic vertebrae are to be segmented. A pre-positioning of the three meshes in shown in the second image 32. Since this initialization results from rigidly transformed models, the meshes slightly overlap. A separate adaptation of each vertebra results in a much larger overlap of the meshes since the transition from cortical to cancellous bone is comparable to the bone boundary, and hence the adaptation algorithm is not able to find the correct edges as illustrated in the third image 33. Our connection energy, however, does not only preserve the spatial relationship of the vertebral meshes, it additionally corrects for initial mesh overlaps and hence results in a reasonable segmentation as illustrated in the fourth image 34. The minimal distance of 2 mm between successive vertebrae is required.

A person skilled in the art will appreciate that the system 100 may be a valuable tool for assisting a physician in many aspects of her/his job. Further, although the embodiments of the system are illustrated using medical applications of the system, non-medical applications of the system are also contemplated.

Those skilled in the art will further understand that other embodiments of the system 100 are also possible. It is possible, among other things, to redefine the units of the system and to redistribute their functions. Although the described embodiments apply to medical images, other applications of the system, not related to medical applications, are also possible.

The units of the system 100 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 4:
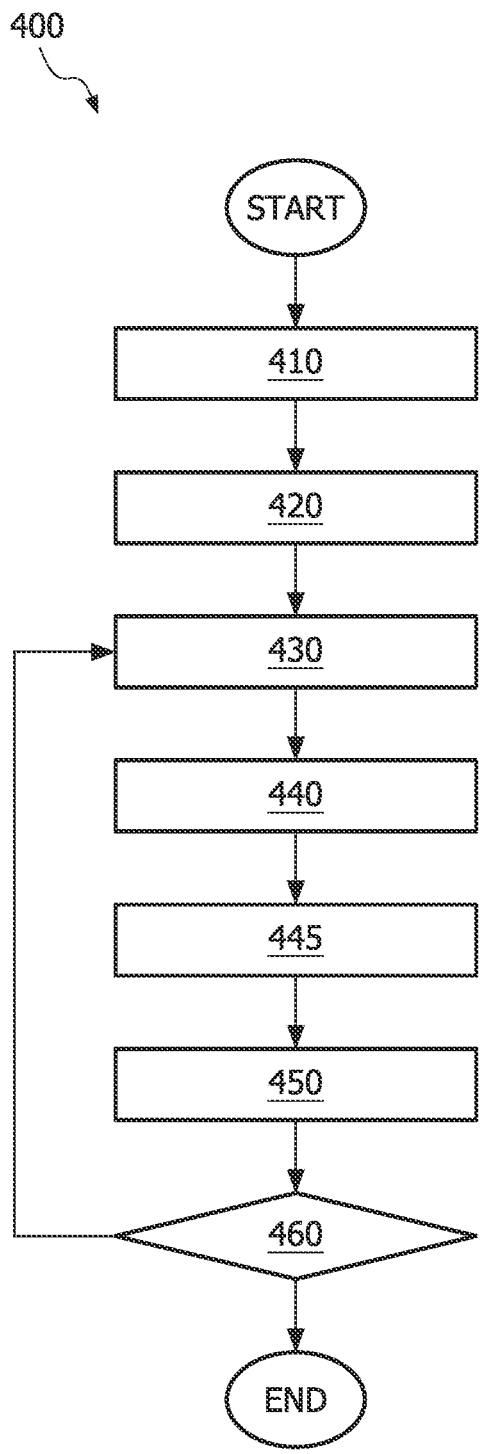
FIG. 4 shows a flowchart of an exemplary implementation of the method.

FIG. 4 shows a flowchart of an exemplary implementation of the method 400 of segmenting a plurality of objects in image data using simultaneous model-based image segmentation. The method 400 begins with a pre-positioning step 410 for pre-positioning a first mesh for segmenting a first object of the plurality of objects, thereby initializing a first mesh current position, and for pre-positioning a second mesh for segmenting a second object of the plurality of objects, thereby initializing a second mesh current position. After the pre-positioning step 410, the method 400 continues to a connection step 420 for defining a plurality of connecting edges for connecting first end vertices to second end vertices, wherein the first and second end vertices are selected from vertices of the first and second mesh, respectively. After the connection step 420, the method 400 continues to a feature step 430 for identifying first features in the image data for computing an external energy of the first mesh on the basis of the first mesh current position, and for identifying second features in the image data for computing an external energy of the second mesh on the basis of the second mesh current position. After the feature step 430, the method continues to a transformation step 440 for computing a first transformation which best aligns the first mesh in the first mesh current position with the pre-positioned first mesh for computing an internal energy of the first mesh, and for computing a second transformation which best aligns the second mesh in the second mesh current position with the pre-positioned second mesh for computing an internal energy of the second mesh. After the transformation step 440, the method 400 continues to an adaptation step 450 for updating the first and second mesh current position by varying current positions of vertices of the first and second mesh to minimize a weighted sum of at least the external energy and the internal energy of the first and second mesh and a connection energy, wherein the connection energy is computed based on the plurality of connecting edges in a configuration determined based on the first and second mesh current position and on the plurality of connecting edges in a reference configuration defined by the pre-positioned first and second mesh. After the adaptation step 450, the method 400 continues to a control step 460 for evaluating a convergence condition dependent at least on the minimized weighted sum or on the updated position of the first and second mesh, and further for terminating segmenting the plurality of objects in the image data if the condition is satisfied and for continuing segmenting the plurality of objects in the image data to the feature step 430 if the condition is not satisfied.

A person skilled in the art may change the order of some steps or perform some steps concurrently using threading models, multi-processor systems or multiple processes without departing from the concept as intended by the present invention. Optionally, two or more steps of the method of the current invention may be combined into one step. Optionally, a step of the method of the current invention may be split into a plurality of steps.

Figure 5:
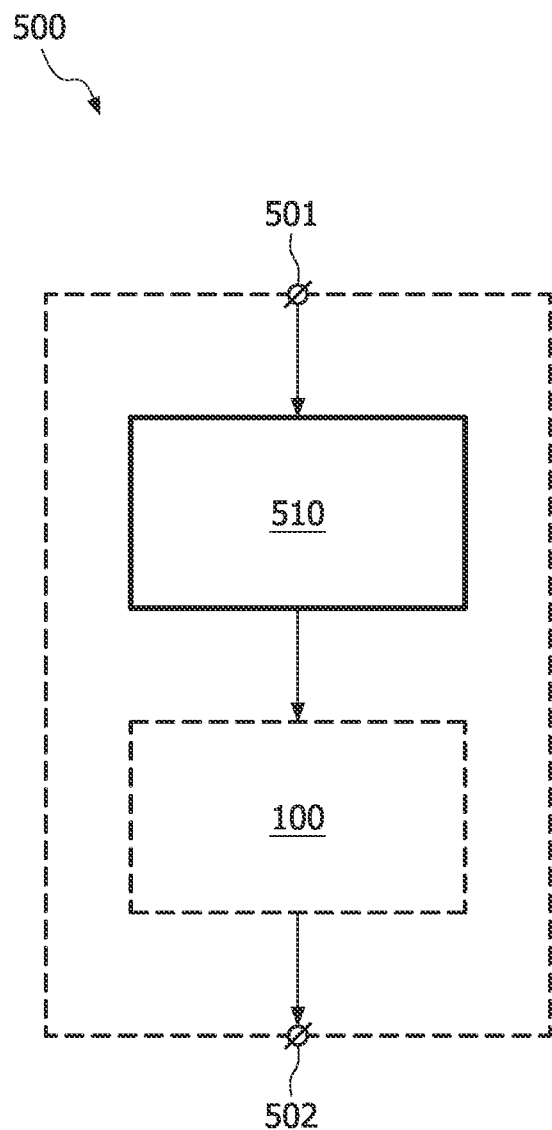
FIG. 5 schematically shows an exemplary embodiment of the image acquisition apparatus.

FIG. 5 schematically shows an exemplary embodiment of the image acquisition apparatus 500 employing the system 100 of the invention, said image acquisition apparatus 500 comprising an image acquisition unit 510 connected via an internal connection with the system 100, an input connector 501, and an output connector 502. This arrangement advantageously increases the capabilities of the image acquisition apparatus 500, providing said image acquisition apparatus 500 with advantageous capabilities of the system 100.

Figure 6:
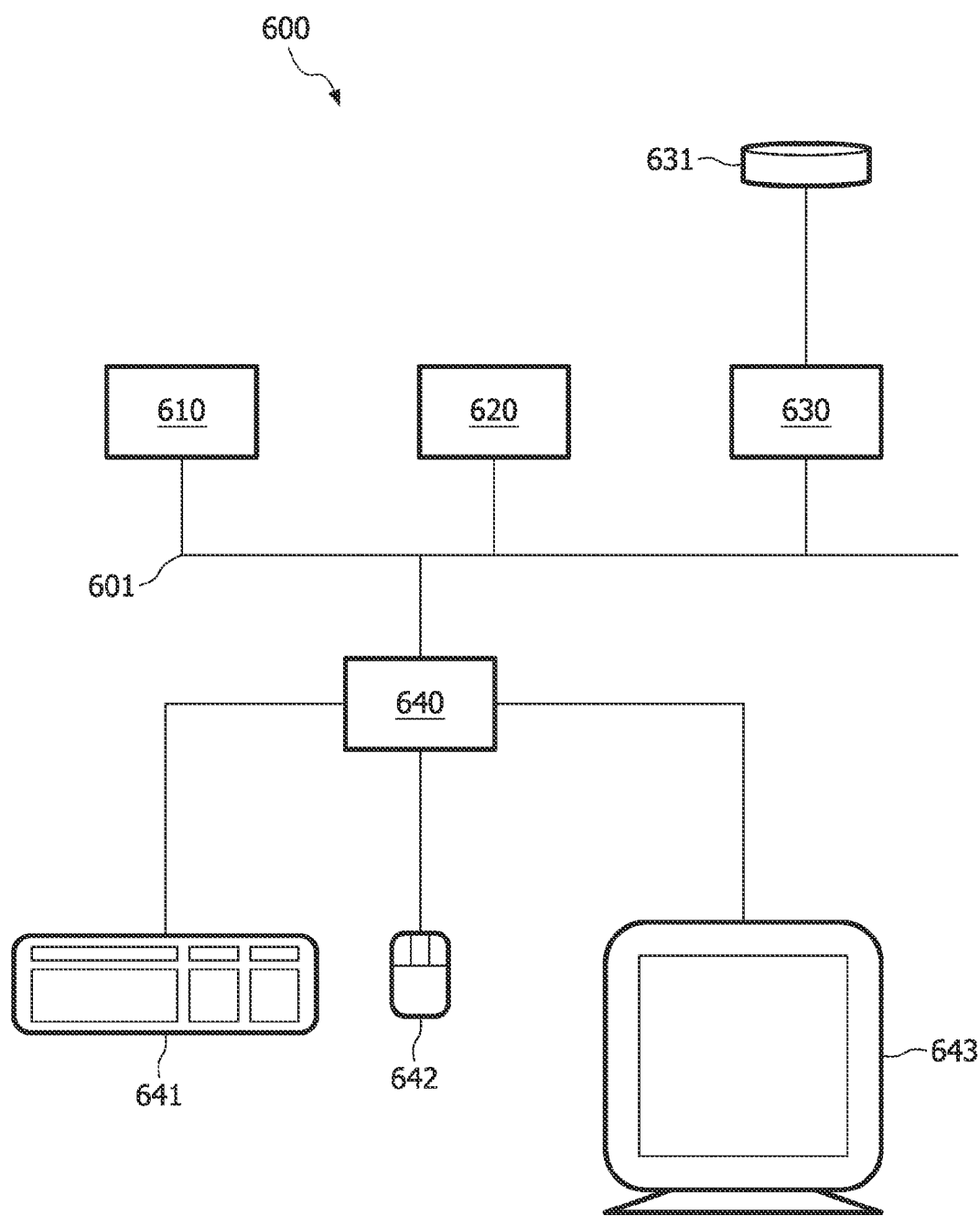
FIG. 6 schematically shows an exemplary embodiment of the workstation.

FIG. 6 schematically shows an exemplary embodiment of the workstation 600. The workstation comprises a system bus 601. A processor 610, a memory 620, a disk input/output (I/O) adapter 630, and a user interface (UI) 640 are operatively connected to the system bus 601. A disk storage device 631 is operatively coupled to the disk I/O adapter 630. A keyboard 641, a mouse 642, and a display 643 are operatively coupled to the UI 640. The system 100 of the invention, implemented as a computer program, is stored in the disk storage device 631. The workstation 600 is arranged to load the program and input data into memory 620 and execute the program on the processor 610. The user can input information to the workstation 600, using the keyboard 641 and/or the mouse 642. The workstation is arranged to output information to the display device 643 and/or to the disk 631. A person skilled in the art will understand that there are numerous other embodiments of the workstation 600 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second, third, etc., does not indicate any ordering. These words are to be interpreted as names.

The invention claimed is:

1. A system for segmenting a plurality of objects in image data using simultaneous model-based image segmentation, the system comprising:

a pre-positioning unit, executed by a microprocessor, for pre-positioning a first mesh for segmenting a first object of the plurality of objects, thereby initializing a first mesh current position, and for pre-positioning a second mesh for segmenting a second object of the plurality of objects, thereby initializing a second mesh current position;

a connection unit, executed by the microprocessor, for defining a plurality of connecting edges for connecting first end vertices to second end vertices, wherein the first and second end vertices are selected from vertices of the first and second mesh, respectively;

a feature unit, executed by the microprocessor, for identifying first features in the image data for computing an external energy of the first mesh on the basis of the first mesh current position, and for identifying second features in the image data for computing an external energy of the second mesh on the basis of the second mesh current position;

a transformation unit, executed by the microprocessor, for computing a first transformation which best aligns the first mesh in the first mesh current position with the pre-positioned first mesh for computing an internal energy of the first mesh, and for computing a second transformation which best aligns the second mesh in the second mesh current position with the pre-positioned second mesh for computing an internal energy of the second mesh;

an adaptation unit, executed by the microprocessor, for updating the first and second mesh current position by varying current positions of vertices of the first and second mesh to minimize a weighted sum of at least the external energy and the internal energy of the first and second mesh and a connection energy, wherein the connection energy is computed based on the plurality of connecting edges in a configuration determined based on the first and second mesh current position and on the plurality of connecting edges in a reference configuration defined by the pre-positioned first and second mesh;

a control unit, executed by the microprocessor, for evaluating a convergence condition dependent at least on the minimized weighted sum or on the updated position of the first and second mesh, and further for terminating segmenting the plurality of objects in the image data if the condition is satisfied and for continuing segmenting the plurality of objects in the image data if the condition is not satisfied; and wherein each contribution $E_{con,i}$ of the first mesh $M_k$ and the second mesh and $M_j$ is defined according to:

$$E_{con,i} = \sum_{(j,k) \in Edges(C_i)} (\langle x_k - x_j, v_i \rangle - \max(\langle \hat{x}_k - \hat{x}_j, \hat{v}_i \rangle, d_i))^2,$$

wherein $v_i$ is a vector perpendicular to a first plane and a second plane, wherein the first plane and the second plane are parallel, wherein the first plane is defined by a first set of vertices of first mesh $M_k$ connected to a second set of vertices of second mesh $M_j$, wherein the second plane is defined by the first set of vertices of the first mesh $M_j$ connected to the second set of vertices of the second mesh $M_k$, the vector going from the first plane through a set of first points of $M_k$ to the second plane through a second set of points of $M_j$, wherein $d_i$ is a minimal distance of each of a plurality of connecting edges of the first plane and the second plane.

2. The system as claimed in claim 1, further comprising a connection parameter unit for computing a parameter for calculating the connection energy.

3. The system as claimed in claim 2, wherein the parameter for calculating the connection energy is a connection transformation for transforming the plurality of connecting edges which best aligns the plurality of connecting edges in the configuration determined based on the first and second mesh current position with the plurality of connecting edges in the reference configuration.

4. The system as claimed in claim 3, wherein the connection energy is based on vector differences of edges of the plurality of connecting edges in the configuration determined based on the first and second mesh current position and further transformed using the connection transformation and respective edges of the plurality of connecting edges in the reference configuration.

5. The system as claimed in claim 2, wherein the parameter for calculating the connection energy is a vector computed based on positions of the first end vertices and on positions of the second end vertices.

6. The system as claimed in claim 5, wherein the connection energy is based on scalar products of the vector by edges of the plurality of connecting edges in the configuration determined based on the first and second mesh current position and by respective edges of the plurality of connecting edges in the reference configuration.

7. An image acquisition apparatus comprising the system as claimed in claim 1.

8. A workstation comprising the system as claimed in claim 1.

9. The system of claim 1, wherein the weighted sum is expressed according to:

$$E = \sum_{i=1}^{n} \alpha_i E_{ext,i} + \sum_{i=1}^{n} \beta_i E_{int,i} + \sum_{i=1}^{m} \gamma_i E_{con,i},$$

wherein $\alpha_i$ is a first weight of the external energy $E_{ext}$, $\beta_i$ is a second weight of the internal energy $E_{int}$, and $\gamma_i$ is a third weight of the connection energy $E_{con}$, wherein n is a number of meshes to be adapted to each object in the image data, wherein m is the number of pluralities of connecting edges connecting pairs of each mesh.

10. A method of segmenting a plurality of objects in image data using simultaneous model-based image segmentation, the method comprising:

a pre-positioning step for pre-positioning a first mesh for segmenting a first object of the plurality of objects, thereby initializing a first mesh current position, and for pre-positioning a second mesh for segmenting a second object of the plurality of objects, thereby initializing a second mesh current position;

a connection step for defining a plurality of connecting edges for connecting first end vertices to second end vertices, wherein the first and second end vertices are selected from vertices of the first and second mesh, respectively;

a feature step for identifying first features in the image data for computing an external energy of the first mesh on the basis of the first mesh current position, and for identifying second features in the image data for computing an external energy of the second mesh on the basis of the second mesh current position;

a transformation step for computing a first transformation which best aligns the first mesh in the first mesh current position with the pre-positioned first mesh for computing an internal energy of the first mesh, and for computing a second transformation which best aligns the second mesh in the second mesh current position with the pre-positioned second mesh for computing an internal energy of the second mesh;

an adaptation step for updating the first and second mesh current position by varying current positions of vertices of the first and second mesh to minimize a weighted sum of at least the external energy and the internal energy of the first and second mesh and a connection energy, wherein the connection energy is computed based on the plurality of connecting edges in a configuration determined based on the first and second mesh current position and on the plurality of connecting edges in a reference configuration defined by the pre-positioned first and second mesh;

a control step for evaluating a convergence condition dependent at least on the minimized weighted sum or on the updated position of the first and second mesh, and further for terminating segmenting the plurality of objects in the image data if the condition is satisfied and for continuing segmenting the plurality of objects in the image data if the condition is not satisfied; and wherein each contribution $E_{con,i}$ of the first mesh $M_k$ and the second mesh and $M_j$ is defined according to:

$$E_{con,i} = \sum_{(j,k)\in Edges(C_i)} (\langle x_k - x_j, v_i \rangle - \max(\langle \hat{x}_k - \hat{x}_j, \hat{v}_i \rangle, d_i))^2,$$

wherein $v_i$ is a vector perpendicular to a first plane and a second plane, wherein the first plane and the second plane are parallel, wherein the first plane is defined by a first set of vertices of first mesh $M_k$ connected to a second set of vertices of second mesh $M_j$, wherein the second plane is defined by the first set of vertices of the first mesh $M_j$ connected to the second set of vertices of the second mesh $M_k$, the vector going from the first plane through a set of first points of $M_k$ to the second plane through a second set of points of $M_j$, wherein $d_i$ is a minimal distance of each of a plurality of connecting edges of the first plane and the second plane.

11. A non-transitory computer readable medium to be loaded by a computer arrangement, comprising instructions for segmenting a plurality of objects in image data using simultaneous model-based image segmentation, the computer arrangement comprising a processing unit and a memory, the computer readable medium, after being loaded, providing said processing unit with the capability to carry out steps of a method as claimed in claim 10.

12. The method as claimed in claim 10, further comprising a connection step for computing a parameter for calculating the connection energy.

13. The method as claimed in claim 12, wherein the parameter for calculating the connection energy is a connection transformation for transforming the plurality of connecting edges which best aligns the plurality of connecting edges in the configuration determined based on the first and second mesh current position with the plurality of connecting edges in the reference configuration.

14. The method as claimed in claim 13, wherein the connection energy is based on vector differences of edges of the plurality of connecting edges in the configuration determined based on the first and second mesh current position and further transformed using the connection transformation and respective edges of the plurality of connecting edges in the reference configuration.

15. The method as claimed in claim 12, wherein the parameter for calculating the connection energy is a vector computed based on positions of the first end vertices and on positions of the second end vertices.

16. The method as claimed in claim 15, wherein the connection energy is based on scalar products of the vector by edges of the plurality of connecting edges in the configuration determined based on the first and second mesh current position and by respective edges of the plurality of connecting edges in the reference configuration.

17. The method of claim 10, wherein the weighted sum is expressed according to:

$$E = \sum_{i=1}^{n} \alpha_i E_{ext,i} + \sum_{i=1}^{n} \beta_i E_{int,i} + \sum_{i=1}^{m} \gamma_i E_{con,i},$$

wherein $\alpha_i$ is a first weight of the external energy $E_{ext}$, $\beta_i$ is a second weight of the internal energy $E_{int}$, and $\gamma_i$ is a third weight of the connection energy $E_{con}$, wherein n is a number of meshes to be adapted to each object in the image data, wherein m is the number of pluralities of connecting edges connecting pairs of each mesh.

\* \* \* \* \*